United States Patent [19]

Hagerty et al.

[11] Patent Number: 4,883,522

[45] Date of Patent: Nov. 28, 1989

[54] FABRICATION OF MACRO-GRADIENT OPTICAL DENSITY TRANSMISSIVE LIGHT CONCENTRATORS, LENSES AND COMPOUND LENSES OF LARGE GEOMETRY

[75] Inventors: James J. Hagerty, Saratoga; Leslie A. Danziger, Los Altos Hills, both of Calif.

[73] Assignee: Integrated Solar Technologies Corp., San Jose, Calif.

[21] Appl. No.: 206,109

[22] Filed: Jun. 17, 1988

Related U.S. Application Data

[63] Continuation-in-part of Ser. No. 87,598, Aug. 19, 1987, abandoned.

[51] Int. Cl.⁴ ............................................. C03B 19/06
[52] U.S. Cl. ..................................... 65/18.4; 65/18.1; 65/37; 65/39; 65/41
[58] Field of Search ............... 65/37, 41, 39, 36, 18.1, 65/18.4

[56] References Cited

U.S. PATENT DOCUMENTS

| | | | |
|---|---|---|---|
| 3,145,090 | 8/1964 | Buckner et al. | 65/18.1 |
| 3,271,179 | 9/1966 | Smith, Jr. | 65/37 UX |
| 3,614,197 | 10/1971 | Nishizawa et al. | 65/4 X |
| 3,718,383 | 2/1973 | Moore | 65/37 UX |
| 4,421,539 | 12/1983 | Edahiro et al. | 65/18.4 X |
| 4,433,239 | 4/1984 | Biswas et al. | 65/18.1 X |
| 4,560,399 | 12/1985 | Luong | 65/18.1 |

*Primary Examiner*—Arthur Kellogg
*Attorney, Agent, or Firm*—Ashen Golant Martin & Seldon

[57] ABSTRACT

Gradient optical density transmissive light directing devices (24, 26, 28, 30) and fabrication thereof are disclosed herein. Examples of such devices include concentrators, lenses and compound lenses. The present invention teaches a process for the fabrication of glass light transmitting devices having a chosen gradient in index of refraction either bidirectionally (radially and longitudinally relative to an optical axis) or in three dimensions. The present invention further describes the design of several interesting optical devices by particular choices of the gradient in the index of refraction thereof. Such articles have numerous uses in the optics, optical fiber and solar technology industries for the purposes of designing compound lens systems using a single, integral lens, coupling light into fibers and for concentrating and directing light from a source having a significant angular variation to an energy collecting and/or conversion devices such as a photovoltaic cell, to name but a few applications.

7 Claims, 10 Drawing Sheets

Index of refraction

FABRICATION OF MACRO-GRADIENT OPTICAL DENSITY TRANSMISSIVE LIGHT CONCENTRATORS, LENSES AND COMPOUND LENSES OF LARGE GEOMETRY

CROSS-REFERENCE TO RELATED APPLICATION

The present application is a continuation-n-part application of application Ser. No. 087,598 filed Aug. 19, 1987, now abandoned, and is related to application Ser. No. 206,110, filed June 17, 1988 ("Macro-Gradient Optical Density Transmissive Light Concentrators, Lenses and Compound Lenses of Large Geometry").

TECHNICAL FIELD

The present invention relates generally to devices for directing radiant energy, and more particularly to transmissive light concentration devices and compact optical systems utilizing optically refractive media having a gradient in the optical density or index of refraction in three dimensions.

BACKGROUND ART

Many devices have been reported for concentrating incident electromagnetic radiation onto a receiving element such as a photovoltaic cell. For example, in "Design of Optimal and Ideal 2-D Concentrators with the Collector Immersed in a Dielectric Tube," by Juan C. Minano, Jose M. Ruiz, and Antonio Luque, Appl. Opt. 22, 3960 (1983) the authors observe that the geometrical concentration of a compound parabolic concentrator can be increased by a factor of the index of refraction when a dielectric transparent medium is used to fill the concentrator. Additionally, in U.S. Pat. No. 4,114,592 for "Cylindrical Radiant Energy Direction Device With Refractive Medium," issued to Roland Winston on Sept. 19, 1978, the inventor describes the use of a radiant energy transmission device having opposing reflective sides operable in an energy concentrative mode whereby energy incident on an entrance area is directed to and concentrated on an exit area having a smaller dimension than the entrance area. All devices disclosed therein have reflective walls. Of particular relevance to the subject invention is discussion of FIG. 2 thereof in Column 4, lines 50-68 wherein Winston describes the use of nonhomogeneous optical materials having a gradient index of refraction to bend the incoming light rays and consequently shorten the overall length of the device. The gradient best suited to achieve this purpose is described as having the greater index values along the axis of the generally cylindrical device with the values therefor falling away from this axis. This is known as a purely radial gradient. There is no teaching relating to a longitudinal variation of optical density in addition to the radial variation. Also of relevance to the subject invention is FIG. 3 thereof which teaches the combination of a nonhomogeneous refractive media and a reflective wall. Two media are shown, but an infinite number are possible. The media increase in optical density as a function of the radius of the device. The stated purpose for utilizing such a distribution is to reduce the cost of the overall device; that is, the innermost region might be filled with water. See, e.g., Col. 5, lines 64-68 and Col. 6, lines 1-34.

In U.S. Pat. No. 4,240,692 for "Energy Transmission," issued to Roland Winston on Dec. 23, 1980, the inventor discloses a radiant energy transmitting device operative selectively in a concentrative and emissive modes. Unlike Winston's '592 patent, described hereinabove, where mirrored reflective boundary surfaces are employed, transmitting and guiding surfaces are formed at the interface of media of differing indices of refraction.

Radial refractive optical gradients have been generated in samples of plastic and glass. In U.S. Pat. No. 3,718,383 for "Plastic Optical Element Having Refractive Index Gradient," issued to Robert S. Moore on Feb. 27, 1973, the inventor describes the diffusion of a diluent into a shaped polymeric matrix to form a continuous gradient in refractive index in a direction perpendicular to the optical axis thereof. The diluent and the polymeric material have different refractive indices. In cylindrical samples, an angularly symmetric, radial gradient of refractive index substantially proportional to the radial distance perpendicular to the optical axis may be formed by diffusion of a diluent having lower index of refraction than the plastic matrix material into the matrix from the central core thereof. Similarly, for positive lenses, where the refractive index must decrease in the outward radial direction, inward diffusion of a diluent external to a plastic rod is required.

In U.S. Pat. No. 3,859,103 for "Optical Glass Body Having A Refractive Index Gradient," issued to Mitsugi Yoshiyagawa on Jan. 7, 1975, the inventor describes the production of a continuously decreasing index of refraction from the central axis of a glass object to the peripheral surface thereof as a result of the substitution of thallium ions contained in the glass by external alkali metal ions. Glass containing $Tl_2O$ was chosen since the thallium ions give the glass a high refractive index. The process for achieving the required substitution of ions is to bring the glass article into contact with a chosen molten salt for a period of time sufficient for significant diffusion to take place. A distribution of the refractive indices according to the relationship $N = N_0(1 - ar^2)$ was generated in a glass rod, where r is the distance from the center in the radial direction, a is a positive constant, and $N_0$ is the refractive index at the center of a cross section of the glass body perpendicular to the central axis thereof.

In U.S. Pat. No. 4,053,204, "Optical Fiber Having Reduced Dispersion," issued to Stewart E. Miller on Oct. 11, 1977, and in U.S. Pat. No. 4,076,380, "Graded Index Optical Fiber," issued to Frank Vincent DiMarcello and John Charles Williams on Feb. 28, 1978, the inventors disclose graded refractive index optical fibers having radial gradients in repetitively varying discrete longitudinal zones for improving the dispersion characteristics of light pulses traveling therethrough. In the former patent, the zones are achieved by varying the thickness of each layer of constant optical index material, while in the latter patent, layers of different index of refraction are disposed in a helical pattern along the length of the fiber. Chemical vapor deposition techniques are used to form the layers in both devices.

In U.S. Pat. 4,696,552, "Projection Device with Refractive Index Distribution Type Lens", issued to Jun Hattori and Shigeyuki Suda on Sept. 29, 1987, the inventors disclose a projection device having an illuminating system for illuminating an object, and an index distribution type lens for projecting the image of the object. The lens has a refractive index distribution substantially proportional to the square of the distance from the optic axis in a cross-section perpendicular to the optic axis and a refractive index distribution monotonously varying in the direction of the optic axis. The lens is characterized by dimensions of about 18 mm in length and 0.5 mm in diameter (perpendicular to the optic axis) and a change in refractive index of less than 0.05.

For the purpose of the present specification, we define the term "optical axis" to mean an imaginary straight line which extends internally through the refractive material of the subject invention and which passes through both the entrance and exit surfaces of this material which are adapted for the passage of light. Although there may be more than one optical axis for a chosen embodiment of the invention, in general, the optical axis will be uniquely defined by the geometrical symmetry of the material. In either event, changes in the index of refraction of the refractive material will be defined relative to the optical axis. Also for the purpose of the present specification, we define the term "bidirectional gradient" to refer to a gradient in the index of refraction that occurs along each of two directions, usually mutually orthogonal. Finally, "light" is defined as that electromagnetic radiation in the frequency spectrum ranging from infra-red through visible to ultraviolet.

Notably absent from the patent literature and from the science and engineering literature is a description of transmitting light concentrating and/or directing devices having bidirectionally varying indices of refraction or devices having indices of refraction varying in three dimensions having substantial thickness in the direction of variation of refractive index. Additionally, monotonically varying distributions of optical densities with significant change in index of refraction and over significant dimension in the axial direction have not been described. While Hattori et al, supra, disclose lenses having bi-directional gradient varying indices of refraction, such lenses have no substantial thickness, as the term is used herein, and no significant change in index of refraction, as the term is used herein.

Accordingly, it is an object of the present invention to provide light directing devices having a macro-gradient in the index of refraction, that is, at least about 0.1, and having large geometries, that is at least about 5 mm in the direction perpendicular to the optical axis.

Another object of our invention is to provide non-tracking transmissive optical light concentration and collection devices having greater gain than existing devices.

Yet another object of our invention is to provide transmissive optical systems which are smaller and lighter than existing devices.

Still another object of the present invention is to provide a non-tracking transmissive solar energy collector having a broad acceptance angle.

Another object of our invention is to provide a transmissive light image reducer or enlarger.

Yet another object of the present invention is to provide a process for the fabrication of monolithic glass articles having a significant bidirectional gradient in index of refraction and for the fabrication of glass articles having a varying index of refraction in three dimensions.

Another object of our invention is to generate similar transmission characteristics in a single, integral lens to those provided by at least two individual lenses cooperating as a compound lens.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DISCLOSURE OF INVENTION

To achieve the foregoing and other objects and in accordance with the purpose of the present invention, as embodied and broadly described herein, light directing devices are provided which include a transmissive refractive material having a bidirectional gradient in the refractive index thereof. Examples of such light directing devices include imaging and non-imaging devices, such as lenses, concentrators, and the like.

The light directing devices of the invention are characterized by a macro-gradient in index of refraction. By macro-gradient, or significant gradient, is meant a change index of refraction of at least about 0.1. Further, these devices may possess a gradient in index of refraction of greater than 0.3 and even as high as 0.5, values unheard of in conventional prior art glass articles having a gradient in index of refraction.

The light directing devices of the invention are further characterized by a large geometry, or substantial thickness, with devices as fabricated having a dimension of at least about 5 mm in the direction perpendicular to the optic axis.

In one embodiment of the invention, a non-tracking transmission light concentrator device of this invention includes a transmissive refractive material having generally flat entrance and exit surfaces, and having a bidirectional gradient in the refractive index thereof, the gradient generally changing in a direction perpendicular to an optical axis and generally changing in a direction parallel thereto in the direction from the entrance surface to the exit surface of the refractive medium. In some situations the refractive material might include reflective boundaries as side walls so contoured that energy incident on the entrance surface and directed thereto by the refractive material is substantially directed to the exit surface of the refractive material. Similarly, the reflective boundaries might be opposing surfaces symmetrically disposed about the optical axis extending between the entrance surface and the exit surface and generally contoured such that the refractive material defines a device wherein the entrance surface has a larger area than the exit surface.

In another embodiment of the invention, the non-tracking transmission light concentrator device of this invention includes a transmissive refractive material having generally flat entrance and exit surfaces, and having a bidirectional gradient in the refractive index thereof, the gradient generally decreasing in a direction perpendicular to an optical axis and generally increasing in a direction parallel thereto in the direction from the entrance surface to the exit surface of the refractive medium.

In a further aspect of the present invention, in accordance with its objects and purposes, the image reducing or enlarging device hereof includes a transmissive refractive material having generally flat entrance and exit surfaces, and having a bidirectional gradient in the refractive index thereof, the gradient generally decreasing or increasing in a direction perpendicular to an optical axis, respectively, and generally either increasing or decreasing in a direction parallel thereto in the direction from the entrance surface to the exit surface of the refractive medium, respectively, from the entrance surface to the position of approximately one-half of the length of the optical axis, and further having substantially the opposite variation of the index of refraction both along the optical axis and radially away therefrom from the approximate midpoint thereof to the exit surface of the device. In some situations the refractive material might have a substantially constant index of refraction along the optical axis itself.

In yet a further aspect of the present invention, in accordance with its objects and purposes, the process for preparing an article having a bidirectionally graded index of refraction hereof includes the steps of preparing a series of powdered glass samples having decreasing indices of refraction and similar coefficients of expansion in vitrified form, placing a portion of the powdered glass sample having the highest or lowest index of refraction in the bottom region of a crucible having a chosen shape and having further a generally cylindrical cross section to a chosen height, mechanically compacting the sample, forming an annular region between the wall of the crucible and the central volume thereof beginning above the layer of powdered glass sample having the highest or lowest index of refraction by using a cylindrical tube having a thin wall and a chosen outside diameter, forming successive layers of the powdered glass samples each having a chosen height in the annular region formed and mechanically compacting each layer before the next layer is placed above it, each layer being composed of a powdered glass having an index of refraction lower or higher, respectively, than that of the layer immediately below it, the powdered glass sample having a the lowest or highest index of refraction, respectively, occupying the uppermost layer of the annular region, removing the cylindrical tube, filling the central volume with the powdered glass sample having the highest or lowest index of refraction, respectively, and mechanically compacting it, heating the assembly of powdered glass samples prepared thereby to a temperature above the highest softening temperature of the powdered glass samples employed for a chosen period of time, cooling the fused glasses at a rate such that significant annealing occurs, and removing the fused glasses from the crucible. It is preferred that the glass powders having intermediate indices of refraction result from mixtures of the highest and the lowest index of refraction powdered glass materials.

Benefits and advantages of the present invention include the ability to provide non-tracking transmissive light concentrators and directors having greater concentration and smaller overall dimensions than similar existing devices, and the ability to design single lenses without interfaces which accomplish the function of present compound lenses. Moreover, the process hereof provides monolithic glass articles having significant changes in index of refraction.

BRIEF DESCRIPTION OF THE DRAWINGS

The accompanying drawings, which are incorporated in and form a part of the specification, illustrate four embodiments of the present invention and, together with the description, serve to explain the principles of the invention. Although the discussion set forth hereinbelow is qualitatively true for trough, cylindrically symmetric and even more general shapes, for simplicity, all gains are quoted for trough geometries. In the drawings:

FIG. 2 shows a graphical representation of the functional form of the algorithm chosen to illustrate the dependence of the index of refraction on the distance from the axis of symmetry and along this axis of a combination cylindrical/conical cross section transmissive concentrator shape at five arbitrarily chosen locations along this axis. FIG. 2a shows the location of the five chosen points along the axis of the continuously graded chosen concentrator shape, while

FIG. 3a describes a refractive element constructed of material having a homogeneous index of refraction, FIG. 3b describes a refractive element having a purely radial gradient in its index of refraction, and FIG. 3c describes an identically shaped element having a bidirectional index of refraction according to the algorithm illustrated in FIG. 2 hereinabove for incident light at 10°. The calculated gains are 1.3±0.1, 4.1±0.1, and 6.9±0.1, respectively.

FIGS. 4a-e show a computer generated comparison among a group of refractive elements having parabolic cross section, while FIG. 4a describes a refractive element having a homogeneous index of refraction, FIG. 4b describes a similarly shaped refractive element having a purely radial distribution of indices of refraction, and FIG. 4c describes a refractive element having a bidirectional index of refraction which varies according to the algorithm depicted in FIG. 2 hereof for incident light at 10°. The calculated gains are 2.9±0.1, 4.1±0.1, and 6.9±0.1, respectively. FIG. 4d illustrates the effect of slightly altering the shape of the reflective boundary walls of the parabolic shaped element for a similar distribution of refractive indices as that of the refractive element of FIG. 4c. The gain increases to 8.5±0.1. FIG. 4e shows the effect of increasing the index of refraction for a homogeneous index of refraction refractive element having parabolic reflective boundary walls. The gain increases as would be expected (in fact to 3.9±0.1). FIG. 4f shows the gradient profile of any of the elements of FIGS. 4a-e manifest in a 3-D conical shape. FIG. 4g shows the gradient profile of any of the elements of FIGS. 4a-e extended into a trough shape.

FIG. 6a describes a refractive element having a purely radical gradient in index of refraction, while FIG. 6b describes a similarly shaped refractive element having a bidirectional distribution of index of refraction. The gradients in radial index of refraction for the two Figures were chosen to be identical.

BEST MODES FOR CARRYING OUT THE INVENTION

Briefly, the present invention teaches a process for the fabrication of glass light directing or transmitting devices having a chosen gradient in index of refraction and articles having a chosen gradient index of refraction either bidirectionally (radially and longitudinally relative to an optical axis) or in three dimensions. Such articles have numerous uses in the optics, optical fiber and solar technology industries for the purposes of designing compound lens systems using a single, integral lens, coupling light into fibers and for concentrating and directing light from a source having significant angular variation to an energy collecting and/or conversion devices such as a photovoltaic cell, to name but a few applications for the devices of the present invention.

Figure 1A:
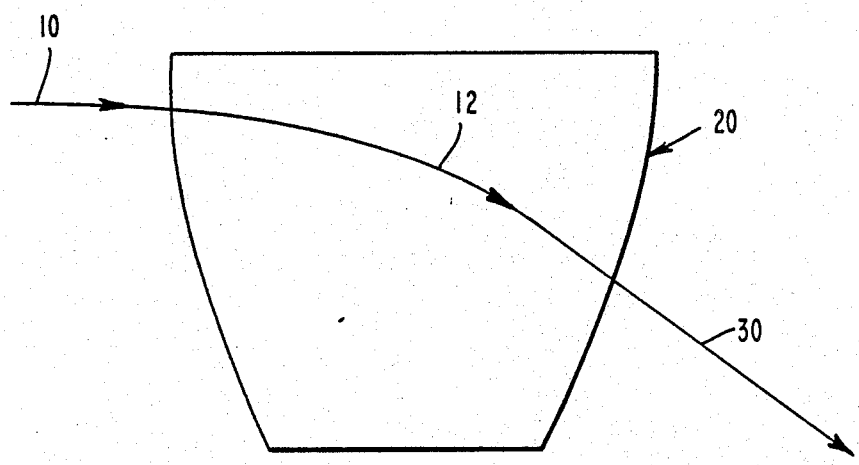
FIG. 1 shows a trace derived from a digitized camera image of HeNe laser radiation passing through a sample of glass fabricated according to the process of the present invention (FIG. 1a) compared with a similarly derived image of HeNe laser radiation passing through a homogeneous sample of glass (FIG. 1b).
Figure 1B:
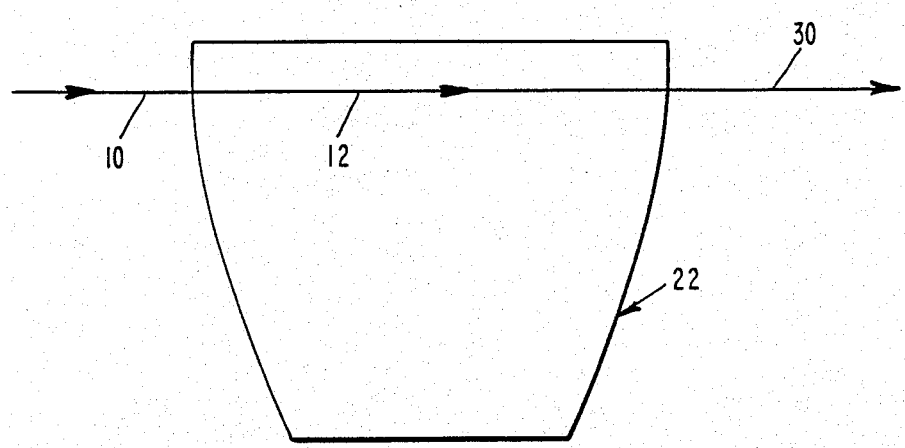

Reference will now be made in detail to the present preferred embodiments of the invention, examples of which are illustrated in the accompanying drawings. Turning now to the drawings, FIG. 1a illustrates a trace derived from a digitized camera image of HeNe laser radiation passing through a sample of glass fabricated according to the process of the present invention. Light 10 from a helium neon laser is curved as it passes through a generally rectangular refractive glass element shown in cross section and having a bidirectional gradient (radially and longitudinally) in its refractive index. The direction of travel of light ray 12 inside of the medium may be controlled independently of the nature of the surface of the refractive material. Exiting light 30 travels in a straight line. This behavior is to be compared with a similarly obtained trace of HeNe laser radiation passing through a homogeneous sample of glass 22 shown in FIG. 1b. It is apparent that no curvature is introduced into the light beam 12 passing through the homogeneous glass sample. There is no evidence of discrete boundaries in the sample fabricated according to the process of the present invention.

The functional form of the index of refraction investigated as an example of the desirable characteristics of refractive devices having a bidirectional gradient in their index of refraction is:

$$n = a - b \cdot [x/B(z)]^2 \cdot [1 - z/D(tot)], \quad (1)$$

where x is the distance from the chosen optical axis of the refractive element, z is the distance along this optical axis with z=0 being located at the entrance surface of the element, a is the maximum index of refraction of the device, b is chosen to provide a given maximum difference in the index of refraction (a−b), B(z) is the functional form of the boundaries of the refractive element, and D(tot) is an adjustable parameter which allows the lens designer to truncate the lens in the z-direction to achieve particular advantages. It should be mentioned that for lenses having cylindrical symmetry, the functional form of Equation 1 provides a three-dimensional representation of the index of refraction. It is anticipated that non-tracking solar concentrators having a generally trough shape will be useful configuration since the seasonal variation of the sun in the temperate zones is approximately 45° while the daily variation in a direction perpendicular to the seasonal variation is 180°. Thus, substantial refractive material can be saved in the construction of concentrators having this geometry. In such case, Equation 1 describes the variation of index of refraction of a cross section or plane of symmetry of the trough perpendicular to what would generally be the long axis thereof.

Figure 2A:
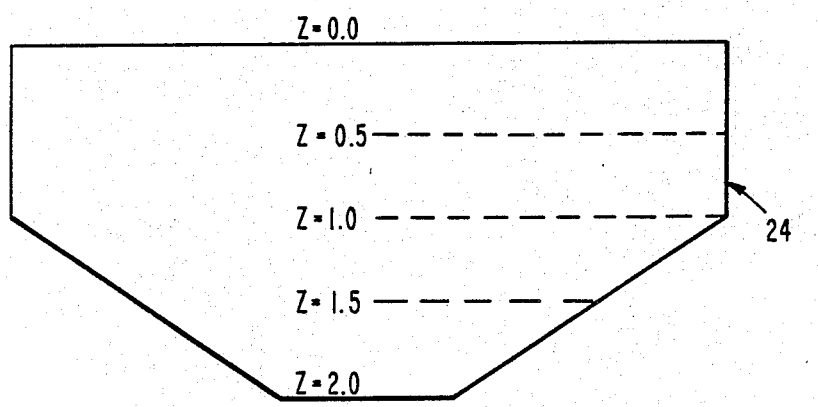
Figure 2B:
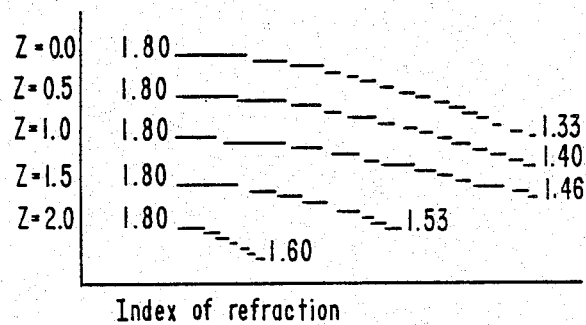
FIG. 2b shows the values of the index of refraction at these locations as a function of radial distance from the axis of symmetry of the lens which is also the optical axis thereof. This algorithm was employed in some of the calculated curves which follow in order to assist in the understanding of the present invention, but other functional forms may provide improved concentrator characteristics.

FIG. 2 shows a graphical representation of the functional form of the algorithm described in Equation 1 for a combination cylindrical/conical transmissive concentrator shape illustrated in a cross sectional view at five points along the axis of symmetry thereof. FIG. 2a shows the location of the five chosen points along the optical axis of the chosen concentrator shape, while FIG. 2b shows the values of the index of refraction at these locations as a function of radial distance from the optical axis of the lens. As mentioned hereinabove, the optical axis may be the axis of symmetry of a generally cylindrical lens, the axis of symmetry of a trough or simply an axis chosen to define the path of a ray of light through a refractive element. The displayed algorithm was employed in all of the calculated curves which follow in order to assist in the understanding of the present invention, but other functional forms may provide other desired concentrator and compound lens characteristics.

Having generally described the invention, the following specific example of the fabrication of a transmitting light concentrating refractive element having significant dimensions and approximating the variation in index of refraction illustrated in Equation 1 is presented as a further illustration thereof. Essentially the same procedure is applicable to the fabrication of integral lenses having the properties of compound lens systems composed of multiple lenses.

EXAMPLE

To produce a bidirectional gradient refractive index having a controlled profile in a monolithic sample of glass, two glass compositions possessing distinct characteristics were obtained. Each glass was in frit form ground to 350 grit size. The first glass, a lead-borate glass, was comprised principally of the following oxides: lead oxide, boron oxide, and aluminum oxide. The glass contained small amounts of silicon, calcium and sodium oxides, along with additives used as fining agents. This glass was purchased from Specialty Glass, Inc. (Oldsmar, FL). The refractive index was 1.97, the softening temperature was 350° C., and the coefficient of thermal expansion was $102 \times 10^{-7}$ cm/cm/° C. The second glass, a sodium borosilicate glass, was comprised principally of the following oxides: silicon dioxide, boron oxide, sodium oxide, aluminum oxide, and potassium oxide. The second glass also contained small amounts of calcium and lead oxides. This glass was similarly purchased from Specialty Glass, Inc. The refractive index of this glass was 1.57, the softening temperature was 950° C., and the coefficient of thermal expansion was $97 \times 10^{-7}$ cm/cm/° C.

The powdered glasses were mixed by weight and labeled as follows:

1 100% of the 1.97 index glass;
2 90% of the 1.97 index glass, 10% of the 1.57 index glass;
3 80% of the 1.97 index glass, 20% of the 1.57 index glass;
4 70% of the 1.97 index glass, 30% of the 1.57 index glass;
5 60% of the 1.97 index glass, 40% of the 1.57 index glass;
6 40% of the 1.97 index glass, 60% of the 1.57 index glass;
7 30% of the 1.97 index glass, 70% of the 1.57 index glass;
8 20% of the 1.97 index glass, 80% of the 1.57 index glass;
9 10% of the 1.97 index glass, 90% of the 1.57 index glass; and
10 100% of the 1.57 index glass.

Approximately 1 ml of the #1 glass powder was placed in the bottom of a generally cylindrical platinum/gold alloy crucible having a 25 ml capacity and having a 3 cm top diameter, a 2 cm bottom diameter, and a 4 cm height. The powder was mechanically compressed using a tamp. A thin wall cylindrical sleeve having an approximate outside diameter of 2 cm was then placed in the crucible such that it rested on the layer of compacted glass #1 and such that its cylindrical axis was approximately colinear with that of the crucible. The sleeve was then surrounded with successive layers of about 0.5 cc each of consecutively numbered glass mixtures, each mixture being mechanically compacted to an approximately 0.4 cm height before the next higher numbered glass mixture was added. The crucible was about filled when the #10 glass powder was added and compacted. The sleeve was then removed and the center region was filled with the #1 glass powder until its compacted height reached the level of the #10 powder. The refractive index of the glass powders would be expected to vary according to the percentages of the component glasses so that a bidirectional gradient in index of refraction would be expected upon fusing the compound mixture produced thereby. The final gradient should vary from a high of 1.97 at the axis to lower values at the exterior of the sample and increase from the top of the sample to the bottom thereof. The crucible was placed in an electric kiln and slowly heated to 1000° C. to permit controlled release of gases adsorbed on the surface of the glass powders. The sample was kept at this temperature for about 10 hours. Longer or shorter time periods were employed depending on the overall size of the crucible employed, longer time periods being used for larger samples. The temperature was reduced at a sufficiently slow rate to permit annealing of all of the glasses used. Typically, the cooling process was achieved in a 10 hour period. After the glass sample reached room temperature, it was removed from the crucible. Separation of the glass from the crucible walls was readily achieved with only minor cracking near the top of the sample. This region was removed by grinding. Flat entrance and exit surfaces (top and bottom of the sample) were also produced by polishing. The size of the glass sample, after polishing, was about 2.5 cm thick and about 2.5 cm top diameter and 2.0 cm bottom diameter.

Since there are presently no methods available to the inventors for measuring a varying index of refraction for a large sample, the precise distribution of indices has not been determined. However, it was found that the hardness of a glass sample produced according to the method described hereinabove increased approximately monotonically from the center of the sample outward in the radial direction and decreased approximately monotonically downward along the sample in a direction parallel to, but displaced from the axis thereof. This behavior would be expected since the higher index of refraction glasses have a lower hardness than the lower index glasses. The index of refraction along the axis of the article is approximately constant.

As mentioned hereinabove, there are no observable boundaries in the articles fabricated according to the process of the invention. Therefore, refractive elements having virtually any functional form for the gradient of the refractive index can be readily fabricated by choosing the appropriate glass samples. If it is desirable to have a close approximation to a particular algorithm, many intermediate index glasses may be employed. Moreover, it should be mentioned that glasses having intermediate indices of refraction may be fabricated from glasses having larger and smaller indices by combining the powdered form of such glasses in proper proportions which relate to the individual indices of refraction of the starting glasses and the desired intermediate index of refraction in a substantially linear manner.

The number of layers of frit in a particular application depend on the resistance to glass fusion and on the change (gradient) in index of refraction desired. Where two compositions have a tendency to separate or where a larger gradient is desired, then more layers of different refractive index will be required. The thinnest articles, perpendicular to the optic axis, that can be fabricated by frit fusion are estimated to be about 5 mm.

In order to better understand the nature of refractive elements having bidirectionally graded indices of refraction a computer model was developed which enables the visual display of the path of light rays incident on an entrance surface through the element for a variety of parameters. The ray paths followed by the light were computed using standard differential equations developed by Moore (J. Opt. Soc. Am. 61, 1195 (1975)). The solution of the equations was implemented by an accurate numerical algorithm that takes into account both the radial and the azimuthal derivatives of the index profile. A figure of merit for the various shapes and distributions of refractive index investigated is the gain or the concentration factor which is given by:

$$\text{Gain} = (\text{Entrance Area/Exit Area}) * (\text{Number Arr./Number Incident}), \quad (2)$$

where Number Arr. is the number of light rays which actually reach the exit surface, there being a significant number which are reflected out of the refractive element depending on the angle of incidence of the light rays. It should be mentioned that all calculated gains reported herein are for trough geometries. Gains will be higher for cylindrically symmetric devices. Therefore, relative gains will be more pronounced for such systems.

Another figure of merit is the shift in the output spot with changes in the angle of the incident light rays. In all situations investigated, the output spot shifts least for the bidirectional gradient for a given geometry and range of optical density. Larger shifts derive from purely radial distributions. See, e.g., the discussion for FIG. 6 hereinbelow. It therefore appears that one beneficial effect of the axial variation in the index of refraction is to prevent the exiting rays from moving too far as the angle of incidence of the light changes. It should be mentioned that there may be situations where control of the shift of the output beam would be an advantage. The apparatus of the present invention permits such control to be achieved. This additional degree of freedom in the design of optical systems and lenses represents an important feature of our invention.

Returning to the figures, it should be stated that the algorithm used to generate the bidirectional gradient has not been optimized nor has the range of indices and the size and shape of the concentrator or compound lens been investigated for optimal performance. Various considerations need be taken into account in the design of a concentrator or a compound lens such as the desired spot size and reduction in the amount of absorption in the transmission process, to identify two. It turns out that the shape of the refractive element is not important for small incident angles since few rays impinge upon the boundaries at sharp angles. For the same reason, reflective coatings are not necessary for small incident angles. Indeed, reflective coatings may not be necessary in most cases. As long as the angle for total internal reflection is not exceeded, few rays are lost from the refractive element. Moreover, it will be apparent to one having ordinary skill in the field of optics after reading the present disclosure that our invention may be used in cooperation with curved entrance and exit surfaces to achieve yet other valuable characteristics.

Figure 3A:
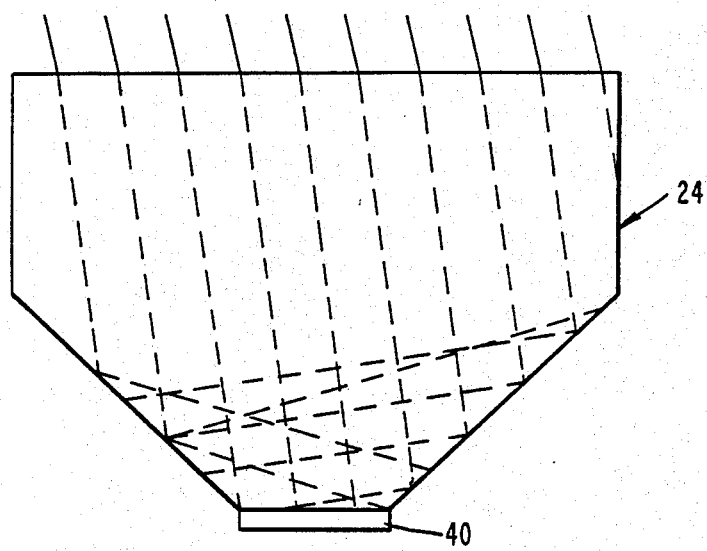
FIGS. 3a-c show a computer generated comparison of the passage of light through a series of conical/cylindrical cross section refractive elements having identical physical dimensions and hereafter referred to as conical/cylindrical elements.
Figure 3B:
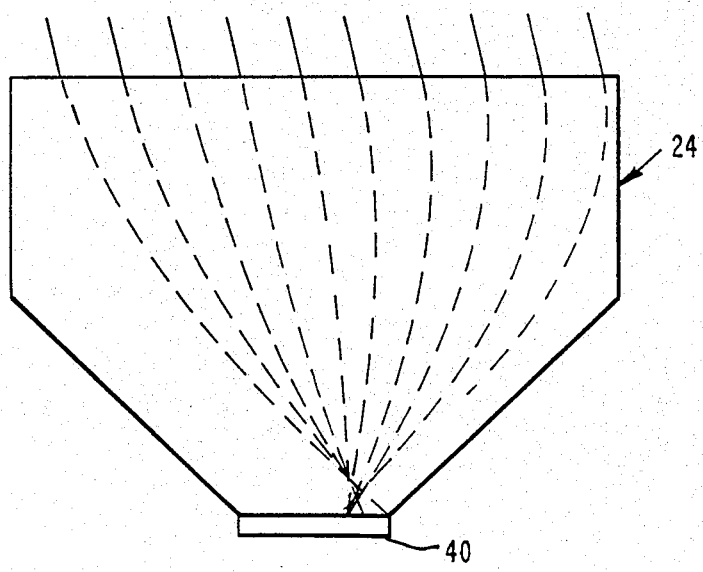
Figure 3C:
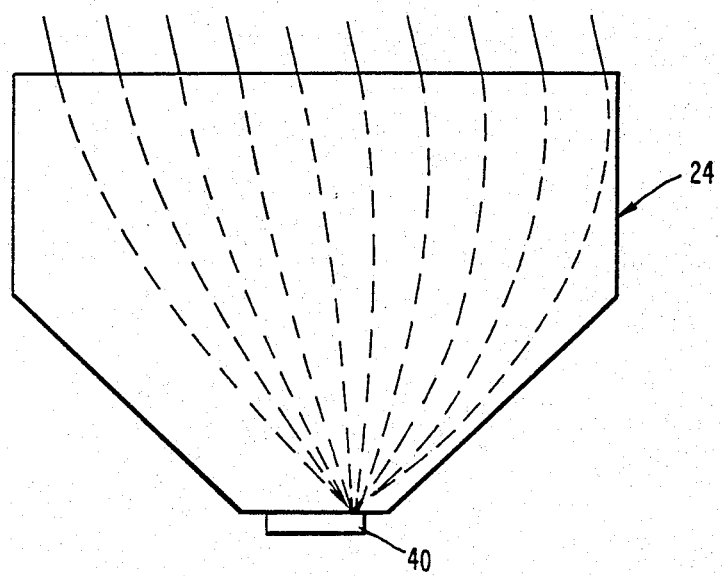
Figure 3D:
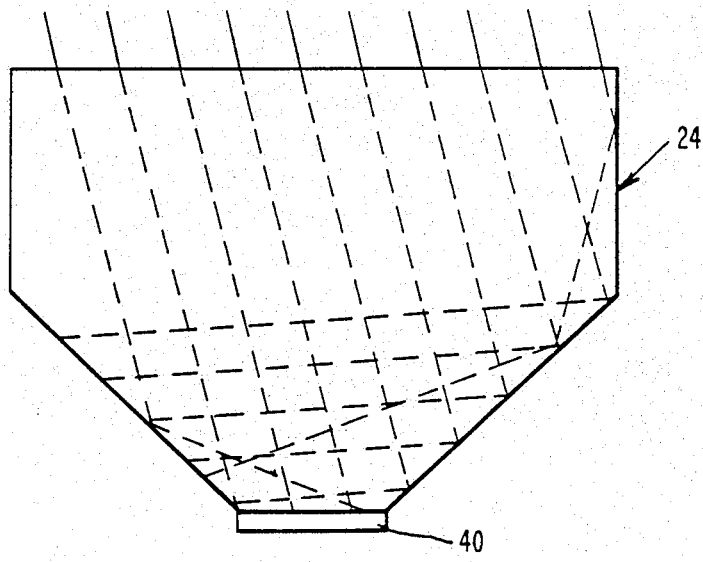
Figure 3E:
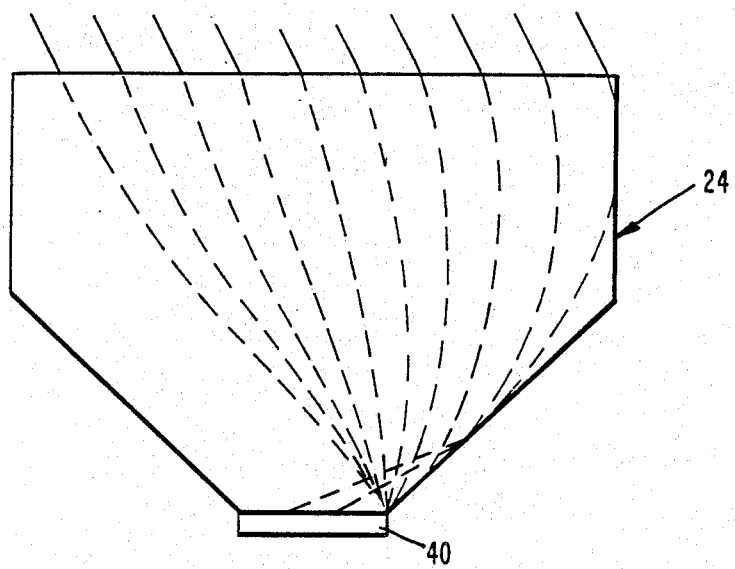

FIGS. 3a–c show a computer generated comparison of the passage of light through a series of conical/cylindrical cross section refractive elements 24. FIG. 3a describes a refractive element constructed of material having a homogeneous index of refraction, FIG. 3b describes a refractive element having a purely radial gradient in its index of refraction, and FIG. 3c describes a similarly shaped element having a bidirectional index of refraction according to the algorithm illustrated in FIG. 2 hereinabove for incident light at 10°. The size of the exit cell 40 is chosen so that all rays not reflected out of the refractive element impinge thereon for angles of incidence to the normal of ±10°. The calculated gains are 1.3±0.1, 4.1±0.1, and 6.9±0.1, respectively. Seven rays escaped from the device shown in FIG. 3a, but none from the other devices of FIG. 3.

Figure 4A:
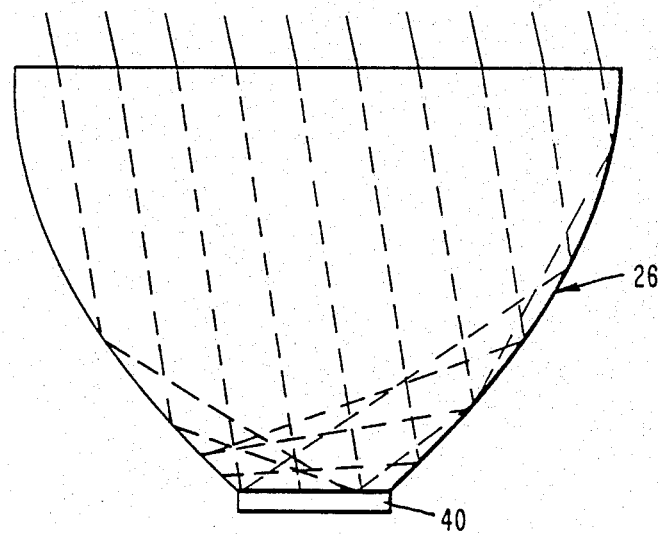
Figure 4B:
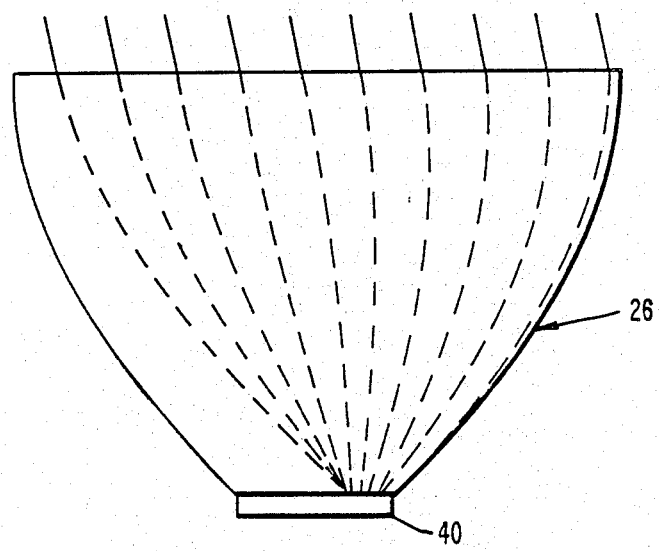
Figure 4C:
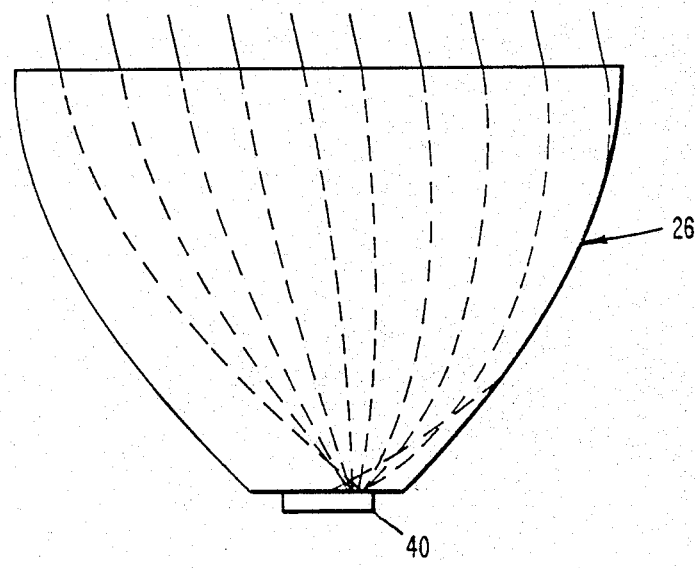
Figure 4D:
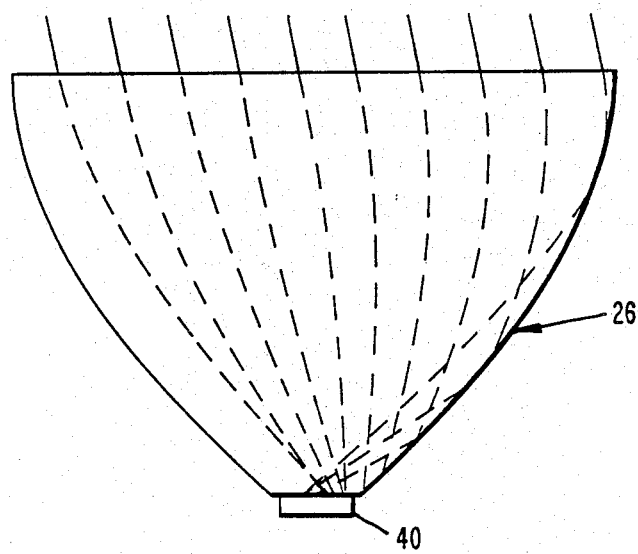
Figure 4E:
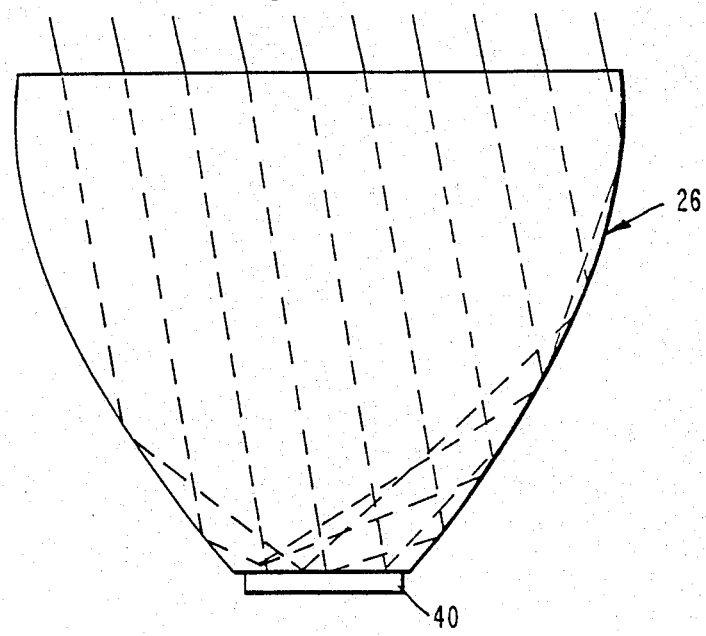

FIGS. 4a–e show a computer generated comparison among a group of refractive elements 26 having parabolic cross section. FIG. 4a describes a refractive element having a homogeneous index of refraction, FIG. 4b describes a similarly shaped refractive element having a purely radial distribution of indices of refraction, and FIG. 4c describes a refractive element having a bidirectional index of refraction which varies according to the algorithm depicted in FIG. 2 hereof for incident light at 10°. The calculated gains are 2.9±0.1, 4.1±0.1, and 6.9±0.1, respectively. FIG. 4d illustrates the effect of slightly altering the shape of the reflective boundary walls of the parabolic cross section element for a similar distribution of refractive indices as that of the refractive element of FIG. 4c. The gain increases to 8.5±0.1. FIG. 4e shows the effect of increasing the index of refraction for a homogeneous index of refraction refractive element having parabolic reflective boundary walls. The gain increases as would be expected (in fact to 3.9±0.1). Three rays escaped from the device shown in FIG. 4a and none from the other devices of FIG. 4.

Figure 4F:
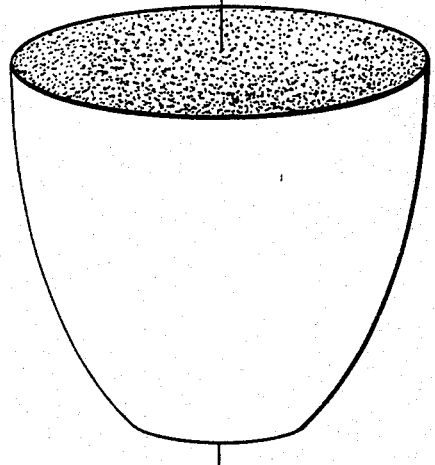
FIGS. 4f-g show examples of the gradient profile manifest in particular three-dimensional shapes.
Figure 4G:
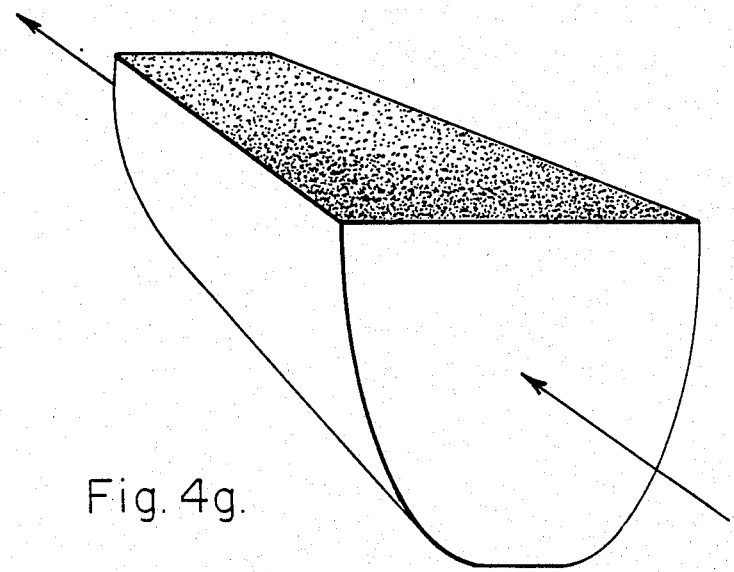

FIGS. 4f–g depict the gradient profile of any of FIGS. 4a–e manifest in three dimensions. FIG. 4f shows the 3-D conically-shaped object obtained by rotating the gradient profile about the vertical axis. FIG. 4g shows the 3-D trough-shaped object obtained by translating the gradient profile along an axis perpendicular thereto.

Figure 5A:
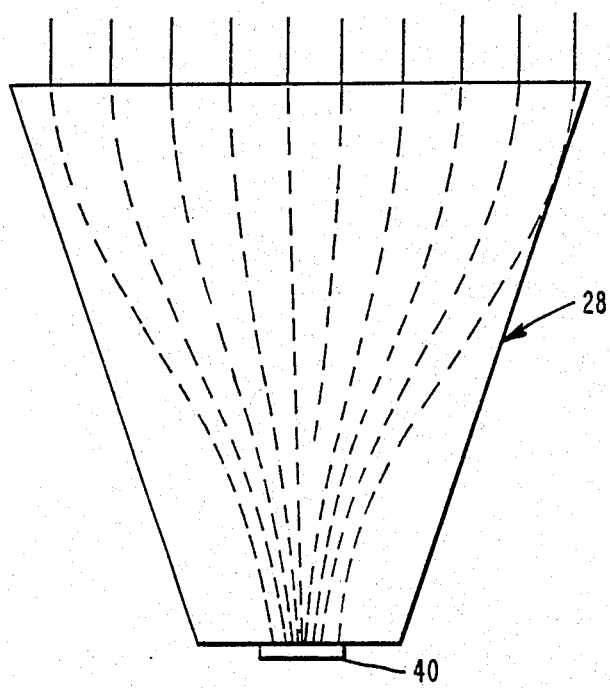
FIG. 5a shows the computer generated response of a refractive element having conical cross section and a compound bidirectional index of refraction according to the algorithm depicted in FIG. 2 hereof which reverses as illustrated in FIG. 5b for normally incident light. The compound refractive element behaves as an image reducer with a calculated gain of 7.0±0.1.
Figure 5B:
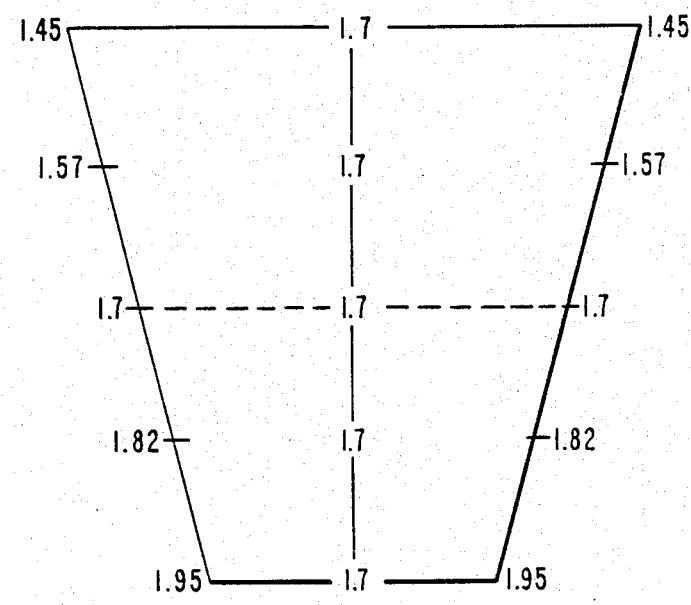

FIG. 5a shows the computer generated response of refractive element 28 having conical cross section and a compound bidirectional index of refraction according to the algorithm depicted in FIG. 2 hereof which reverses as illustrated in FIG. 5b for normally incident light. The compound refractive element behaves as an image reducer with a calculated gain of 7.0±0.1.

Figure 6A:
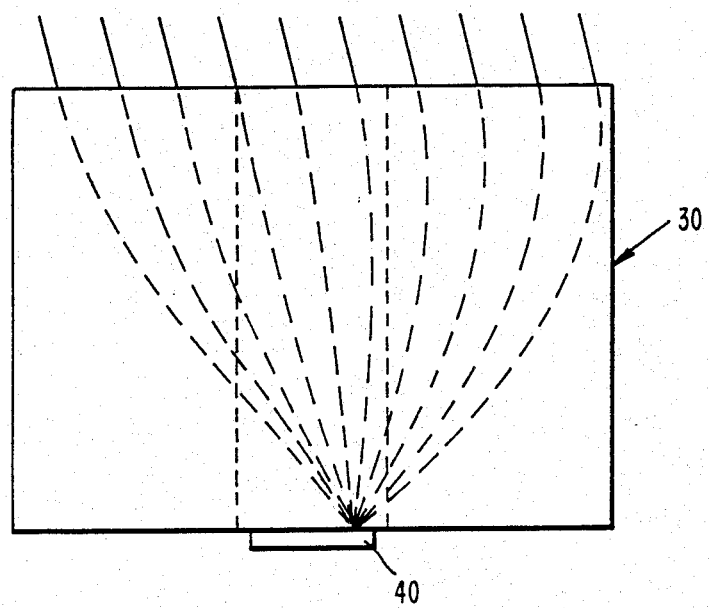
FIG. 6a and 6b show a computer generated comparison between two refractive elements having cylindrical cross section for the purpose of identifying the effect of the longitudinal gradient in the refractive index.
Figure 6B:
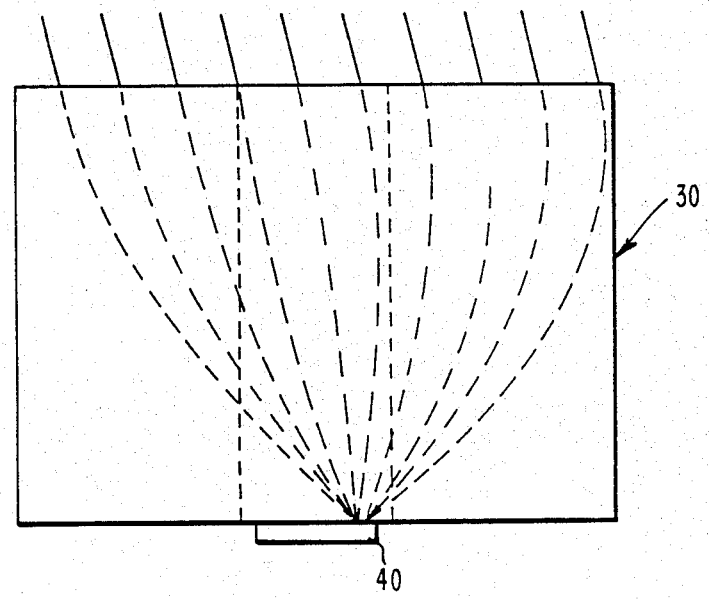

FIG. 6a and 6b show a computer generated comparison between two refractive elements 30 having cylindrical cross section for the purpose of identifying the effect of the longitudinal gradient in the refractive index. FIG. 6a describes a refractive element having a purely radial gradient in index of refraction, while FIG. 6b describes a similarly shaped refractive element having a bidirectional distribution of index of refraction. The gradients in radial index of refraction for the two Figures were chosen to be identical and to have the functional form:

$$n = A(z) + B(z) * x^2, \tag{3}$$

where A and B are functions of z, the distance along the axis of the cylinder, and x is the radius measured therefrom. The size of the focus for the purely radial index of refraction is approximately 0.14 in. in diameter, while the exit surface 40 is about 0.91 in. in diameter, yielding a shift in the focus spot of 0.77 in. The same parameters for the bidirectional gradient are 0.18 in. and 0.77 in., respectively, yielding a shift in the focus spot of 0.59 in. To be observed is that the use of a gradient in refractive index along the axis produces two effects. First, the spot size increases slightly. More importantly, the shift in spot focus is significantly reduced when the angle of incidence for the incoming light rays is changed from +10° to −10 . This effects the overall gain of the refractive element when used as a light concentrator. The gains for the two elements are 5.19±0.1 and 6.17±0.1, respectively.

INDUSTRIAL APPLICABILITY

The light directing devices of the invention have numerous uses in, for example, the optics, optical fiber and solar technology industries for the purposes of designing compound lens systems using a single, integral lens, coupling light into fibers and for concentrating and directing light from a source having a significant angular variation to an energy collecting and/or conversion devices such as a photovoltaic cell.

The foregoing description of several preferred embodiments of the invention has been presented for purposes of illustration and description. It is not intended to be exhaustive or to limit the invention to the precise form disclosed, and obviously many modifications and variations are possible in light of the above teaching. For example, a trough shaped concentrator having an axial and a radial gradient in index of refraction which is propagated in directions perpendicular to the optical axis is within the scope of our invention. As another example, the use of the bidirectional or three dimensional gradient in index of refraction for a transmissive optical device in cooperation with curved entrance and exit surfaces increases the range of possible uses for the present invention. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. A process for preparing a refractive glass article having an intermediate index of refraction from those of the constituent components thereof comprising the steps of: selecting two glass samples having selected indices of refraction and similar coefficients of expansion in vitrified form, powdering the samples to a chose grit, mixing the two powders formed thereby by weight in a proportion which reflects the desired final index of refraction of said refractive article as being substantially a combination of the indices of refraction of the selected glasses according to the proper weight proportion thereof, mechanically compacting the sample, heating the mixture of powdered glass samples prepared thereby to a temperature above the higher of the softening temperatures of the powdered glass samples employed for a chosen period of time, and cooling the fused glasses at a rate such that significant annealing occurs.

2. A process for preparing a refractive glass article having a graded index of refraction comprising the steps of: preparing at least two powdered glass samples having distinct indices of refraction and similar coefficients of expansion in vitrified form, placing the first powdered glass sample in one region of a crucible having a chosen shape, mechanically compacting the sample, placing the second powdered glass sample adjacent to and in contact with the first powdered glass sample, mechanically compacting the second sample, heating the assembly of powdered glass samples prepared thereby to a temperature above the highest softening temperature of the powdered glass samples employed for a chosen period of time, cooling the fused glasses at a rate such that significant annealing occurs, and removing the fused glasses from the crucible.

3. The process as described in claim 2, wherein the glass powders having intermediate indices of refraction result from mixtures of the highest and the lowest index of refraction powdered glass materials.

4. A process for preparing an article having a bidirectionally graded index of refraction comprising the steps of: preparing a series of powdered glass samples having decreasing indices of refraction and similar coefficients of expansion in vitrified form, placing the powdered glass sample having the highest index of refraction in the bottom region of a crucible having a chosen shape and having further a generally cylindrical cross section to a chosen height, mechanically compacting the sample, forming an annular region between the wall of the crucible and the central volume thereof beginning above the layer of powdered glass sample having the highest index of refraction by using a cylindrical tube having a thin wall and a chosen outside diameter, forming successive layers of the powdered glass samples each having a chosen height in the annular region formed and mechanically compacting each layer before the next layer is placed above it, each layer being composed of a glass powder having an index of refraction lower than that of the layer immediately below it, the powdered glass sample having the lowest index of refraction occupying the uppermost layer of the annular region, removing the cylindrical tube, filling the central volume with the powdered glass sample having the highest index of refraction and mechanically compacting it, heating the assembly of powdered glass samples prepared thereby to a temperature above the highest softening temperature of the powdered glass samples employed for a chosen period of time, cooling the fused glasses at a rate such that significant annealing occurs, and removing the fused glasses from the crucible.

5. The process as described in claim 4, wherein the glass powders having intermediate indices of refraction result from mixtures of the highest and the lowest index of refraction powdered glass materials.

6. A process for preparing an article having a bidirectionally graded index of refraction comprising the steps of: preparing a series of powdered glass samples having decreasing indices of refraction and similar coefficients of expansion in vitrified form, placing the powdered glass sample having the lowest index of refraction in the bottom region of crucible having a chosen shape and having further a generally cylindrical cross section to a chosen height, mechanically compacting the sample, forming an annular region between the wall of the crucible and the central volume thereof beginning above the layer of powdered glass sample having the lowest index of refraction by using a cylindrical tube having a thin wall a chosen outside diameter, forming successive layers of the powdered glass samples each having a chosen height in the annular region formed and mechanically compacting each layer before the next layer is placed above it, each layer being composed of a glass powder having a higher index of refraction than that for the one immediately below it, the powdered glass sample having the highest index of refraction occupying the uppermost layer of the annular region, removing the cylindrical tube, filling the central volume with the powdered glass sample having the lowest index of refraction and mechanically compacting it, heating the assembly of powdered glass samples prepared thereby to a temperature above the highest softening temperature of the powdered glass samples employed for a chosen period of time, cooling the fused glasses at a rate such that significant annealing occurs, and removing the fused glasses from the crucible.

7. The process as described in claim 6, wherein the glass powders having intermediate indices of refraction result from mixtures of the highest and the lowest index of refraction powdered glass materials.

* * * * *